United States Patent [19]
Aiken et al.

[11] Patent Number: 5,139,453
[45] Date of Patent: Aug. 18, 1992

[54] SHAPE SORTING EDUCATIONAL TOY

[75] Inventors: Brian L. Aiken, Orlando, Fla.; Patrick W. Brown, North Olmsted, Ohio; Hans R. Espig, East Greenwich, R.I.

[73] Assignee: Dart Industries Inc., Deerfield, Ill.

[21] Appl. No.: 670,091

[22] Filed: Mar. 15, 1991

[51] Int. Cl.[5] .................. A63H 33/04; A63H 3/00; A63H 33/00; G09B 19/00
[52] U.S. Cl. ........................... 446/75; 446/74; 446/489; 434/259
[58] Field of Search ............... 434/247, 258, 259; 446/75, 74, 73, 72, 71, 76, 117, 69, 70, 227, 434, 489

[56] References Cited

U.S. PATENT DOCUMENTS

| | | | |
|---|---|---|---|
| D. 214,928 | 8/1969 | Swett et al. | D21/107 |
| D. 231,738 | 6/1974 | Brass | D19/62 |
| D. 282,940 | 3/1986 | Thomson et al. | D21/105 |
| 741,903 | 10/1903 | Gates | 434/259 |
| 2,377,100 | 5/1945 | Patterson | 434/259 |
| 2,623,303 | 12/1952 | Mindel | 434/259 |
| 2,747,297 | 5/1956 | Zalkind | 434/259 |
| 2,911,740 | 11/1959 | Miller | 434/259 |
| 3,280,499 | 10/1966 | Studen | 446/118 |
| 3,434,232 | 3/1969 | Tarrson | 446/70 |
| 3,760,511 | 9/1973 | Matsumoto | 434/259 |
| 4,008,526 | 2/1977 | Swett et al. | 434/259 |
| 4,149,717 | 4/1979 | Seijiro | 273/440 |
| 4,195,421 | 4/1980 | Tucker et al. | 434/259 |
| 4,353,701 | 10/1982 | Greenberg | 434/259 |
| 4,508,512 | 4/1985 | Girsch et al. | 434/259 |
| 4,988,321 | 1/1991 | Goldfarb | 446/75 |

FOREIGN PATENT DOCUMENTS 1109819  4/1968  United Kingdom ............... 434/259

OTHER PUBLICATIONS

Pots 'n Spoon, Ideal Catalogue; 1976, p. 36.

Primary Examiner—Robert A. Hafer
Assistant Examiner—D. Neal Muir
Attorney, Agent, or Firm—John A. Doninger

[57] ABSTRACT

A sorting device including an open top container with an invertible sorting member mounted thereover. The sorting member includes multiple funnel-shaped passages therethrough each having, at one end, an enlarged opening and at the second truncated end a specifically configured opening of a size to closely receive and pass therethrough only a correspondingly configured block introduced in either direction through the configured opening.

18 Claims, 2 Drawing Sheets

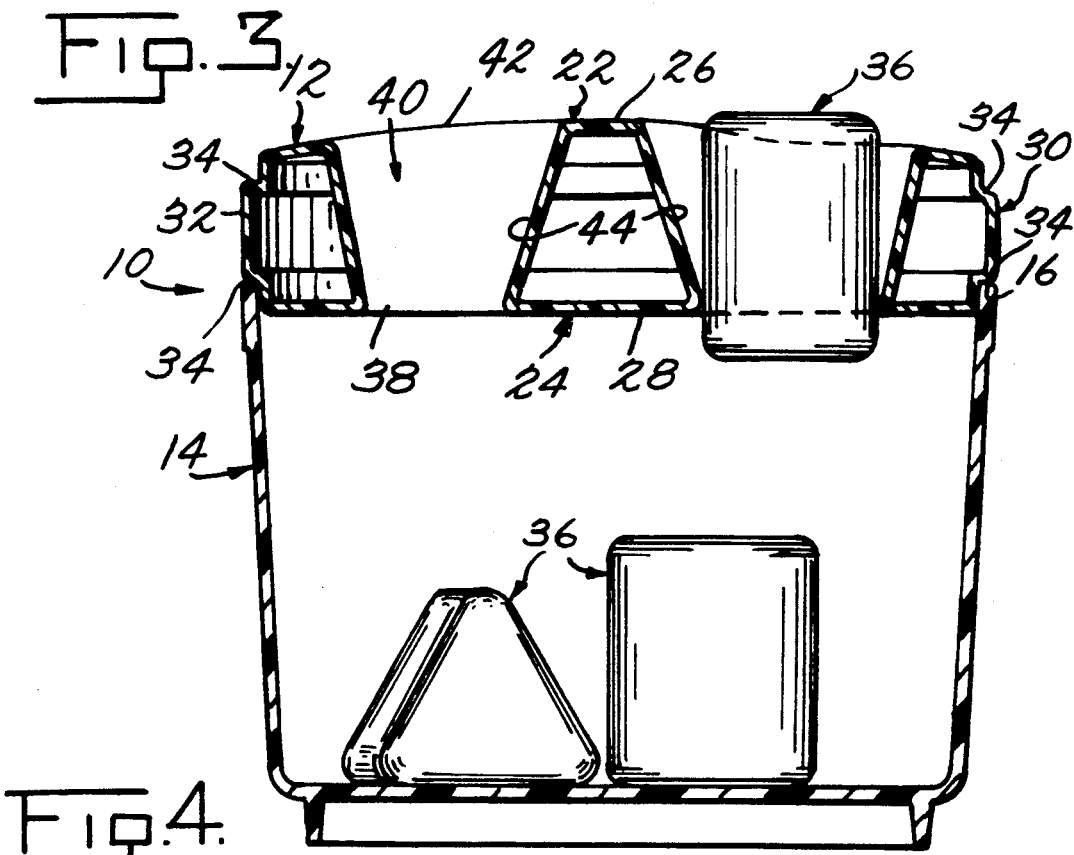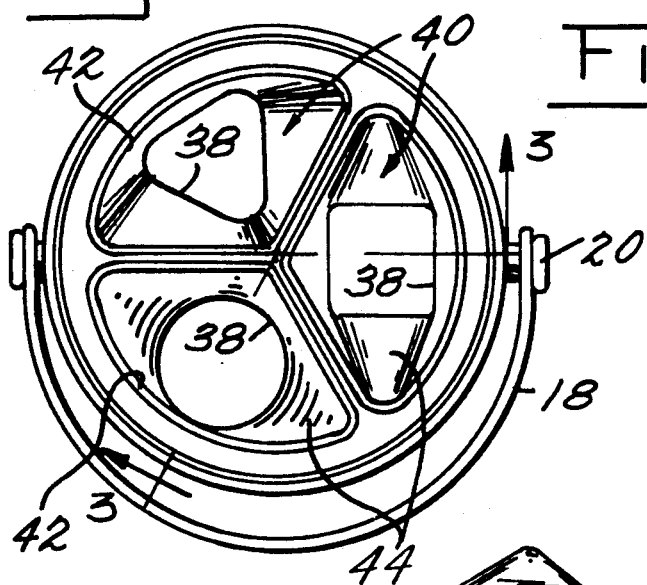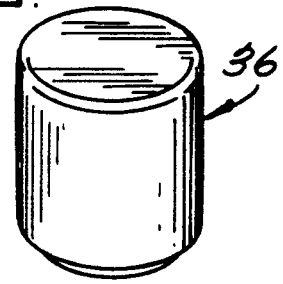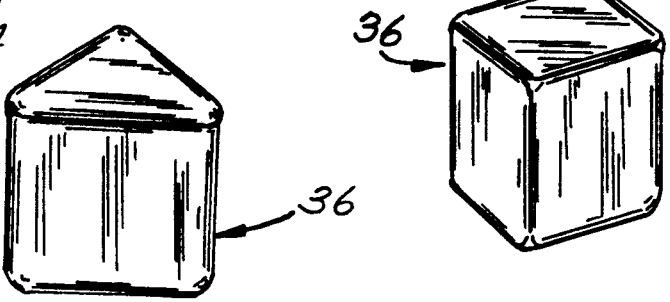

SHAPE SORTING EDUCATIONAL TOY

BACKGROUND OF THE INVENTION

The presentation of educational devices as toys to capture the interest and imagination of young children is an old and well-known art as evidenced by the following U.S. Pat. Nos.:

741,903, Gates
2,623,303, Mindel
4,008,526, Swett et al

Each of these patents discloses a hollow receptacle with an outer surface having a plurality of apertures of different configurations therethrough. A plurality of blocks, each configured to allow for introduction through only a single aperture, are supplied to provide a challenge to the child to match each block with the proper aperture, and to require the exercise of a degree of manual dexterity to properly align and introduce the block through the aperture.

In the known devices the blocks and mating apertures are sized to provide for a close, non-binding or precision fit of the blocks through the apertures to eliminate the possibility of the introduction of the block through a non-mating aperture.

The child user of the device thus must not only visually relate the shape of the block to the shape of the aperture, but also must exercise a relatively high degree of manual dexterity to properly orient the block, in an unguided manner, to the aperture for passage therethrough. As such, the prior art devices are limited to use by children within an age range wherein the child must not only be able to recognize the shapes, but also have the manual capability to exactly align the blocks for introduction through the apertures.

While the patent to Swett et al, U.S. Pat. No. 4,008,526, at 26 in FIG. 26, illustrates a slanted lead to facilitate introduction of the block pieces, this minor beveling of the edge of the aperture does not eliminate the need for an exact alignment of the block with the aperture prior to introduction, and would be of no assistance to the very young in the manipulation of the pieces.

SUMMARY OF THE INVENTION

The present invention proposes an educational toy of the mating block-and-hole type wherein the manipulative skills of children over a wider range of manual dexterity can be accommodated and challenged.

More particularly, the shape sorting device of the invention, in addition to including the close-fitting complementary blocks and openings heretofore associated with this type of educational toy and the manipulative skill and challenge thereof, also provides for guide means optionally available for facilitating alignment of the blocks with and passage of the blocks through the corresponding openings. The use of such guide means, while still constituting a learning experience, requires a substantially lesser degree of manipulative skills and manual dexterity, thereby extending the practicality of the device both as a source of amusement and as a learning tool with progressively more difficult stages.

The shape sorting device includes a support or storage container, preferably in the nature of an upwardly opening pail with a bail handle, and a sorting member or insert received over or nested within the upper open end of the pail.

The sorting member is relatively thick and includes opposed generally planar first and second surfaces. A plurality of passages are defined transversely through said sorting member. Each passage is of a generally funnel-shaped configuration tapering from an enlarged mouth or opening at the first surface of the insert to a reduced and specifically configured opening through the second surface at the truncated end of the funnel-shaped passage.

The specifically configured openings of the plurality of passages at the second surface are each of a different configuration and are adapted to receive similarly configured elongate blocks therethrough with sufficiently close tolerance therebetween to allow insertion of each block only through the corresponding configured opening and only upon exact alignment therewith. As such, with the sorting member or insert positioned on the pail with the second surface uppermost, a relatively high degree of manual dexterity is required for introduction of the blocks through the small configured openings. On the other hand, a positioning of the sorting member or insert with the first surface uppermost allows for unencumbered insertion of the blocks into the enlarged open mouths of the funnel-shaped passages for assisted guidance to the restricted configured openings at the bottom of the passages.

The enlarged openings equally divide the first surface of the sorting member. For example, if three passages are provided as illustrated in the drawings, each enlarged funnel mouth will be in the shape of a circle segment comprising approximately one-third of the area of the circle. The enlarged mouth of each passage allows for a clear viewing of the inner configured opening to provide a visual indication of the shape of the block to be received within the individual passage. The funnel configuration itself allows a child with limited manipulative skills or manual dexterity to readily place the blocks within the enlarged mouths of the passages for assisted guiding of the blocks through the restricted configured openings. As the child's skills increase, the necessity for reliance on the guiding function of the funnel-configuration will be reduced to the point at which the sorting insert can be inverted and the second surface with the configured openings immediately thereat positioned uppermost for introduction of the blocks directly therethrough.

In order to facilitate a handling of the blocks by the user, particularly as the blocks are introduced through the funnel mouth, it is contemplated that the blocks be of a height slightly greater than the thickness of the sorting insert to allow for a continual grasping of the block as it is rotated and otherwise manipulated in the passageway until such time as the block is properly aligned with the reduced configured opening. At that point, the block can be released and it will automatically drop into the underlying storage container or pail.

Other objects and advantages of the invention will be noted in the details of construction and manner of use of the invention as more fully hereinafter set forth.

BRIEF DESCRIPTION OF THE DRAWINGS

FIG. 3 is an enlarged cross sectional view taken substantially on a plane passing along line 3—3 in FIG. 4;

FIG. 4 is a top plan view of the sorting device; and

FIGS. 5, 6 and 7 are perspective views of specifically configured block members.

DESCRIPTION OF PREFERRED EMBODIMENT

Figure 1:
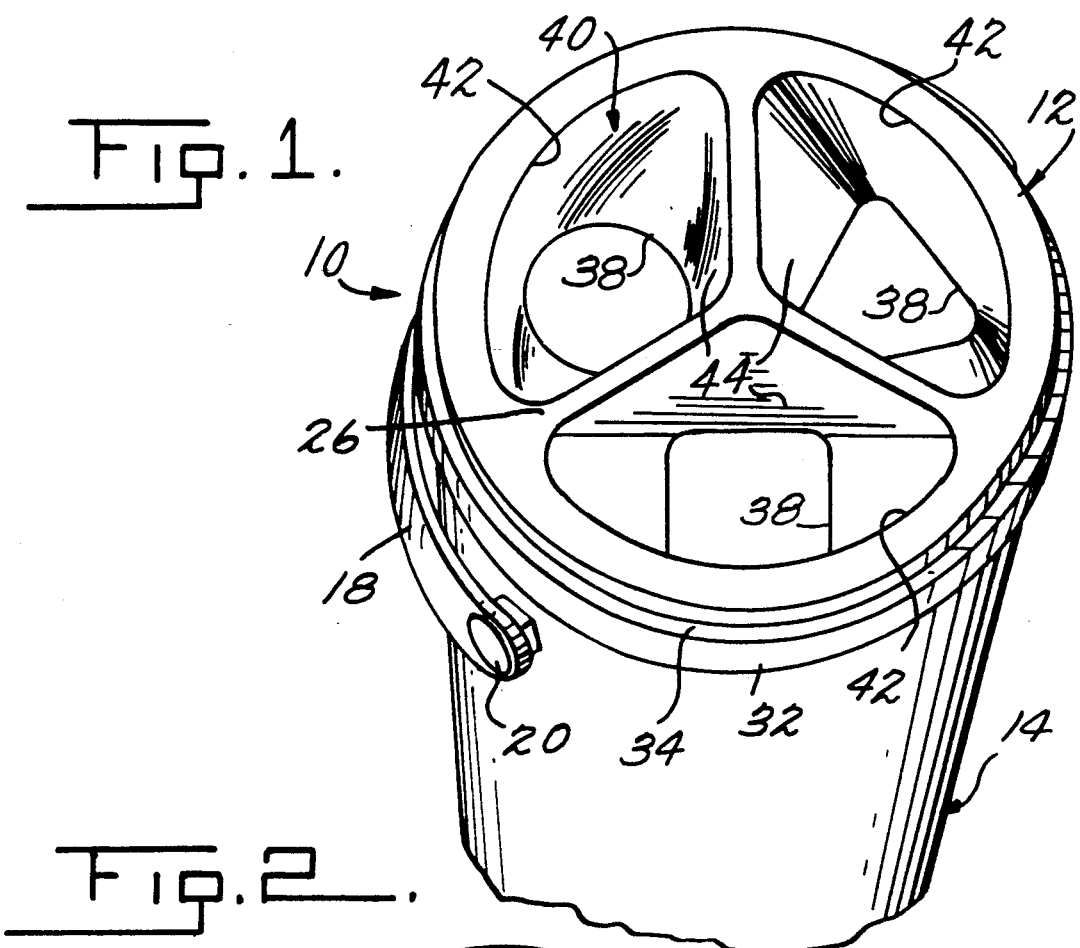
FIG. 1 is a partial perspective view of the sorting device of the invention with the enlarged openings upwardly directed.

Referring more specifically to the drawings, the sorting device 10 comprises a sorting member 12 used in conjunction with a subjacent support normally in the nature of a storage container or pail 14.

The pail 14 may be of generally conventional cylindrical configuration with an open upper end defined by an annular rim 16 and a bail handle 18 pivoted at the opposite ends thereof to a pair of diametrically opposed posts 20. The sorting member 12 will normally be in the nature of an insert partially received with an interference or friction fit within the open upper end of the pail 14 and supported on the rim 16 thereof in a manner to be described subsequently.

The sorting insert 12, while not limited thereto, is preferably of a hollow construction molded of an appropriate rigid synthetic resinous material, for example polyethylene. The insert includes spaced parallel generally planar first and second panels 22 and 24 defining, respectively, first and second surfaces 26 and 28. The panels 22 and 24 are integrally joined by an annular side wall 30 which includes, centrally thereabout, a projecting rib 32 defining vertically spaced and oppositely directed annular shoulders 34. In mounting the sorting insert, which also functions in the manner of a pail lid, in either of the alternate inverted positions thereof, the peripheral wall 30 below the rib 32 is engaged with a friction or interference fit within the open upper end of the pail 14 and the corresponding downwardly directed rib shoulder 34 is seated on the rim 16 of the pail to releasably secure the sorting insert to the pail.

The actual sorting function involves the alignment of specifically configured blocks 36 with specifically configured openings 38 through the second surface 28 of the sorting member or insert 12. Each of these openings 38 is at the truncated end of a funnel-shaped passage 40 vertically through the sorting member 12 between the first and second surfaces 26 and 28. The opposite end of each passage 40 opens through an enlarged mouth or opening 42 at the first surface 26. Each passage 40 is defined, between the opposed panels 22 and 24, by an integral continuous peripheral wall 44 which smoothly funnels or tapers from the enlarged opening 42 at the first surface 26 to the small specifically shaped configured opening 38 at the second surface 28.

The configured openings 38 are each of a different shape and specifically configured to correspond to the shape or cross section of a specific companion block 36 for reception of only that block therethrough. Basically, the shape and cross sectional area of each opening 38 is only sufficiently larger than that of the corresponding block 36 to allow for passage of that block therethrough. As illustrated, three openings 38, with the corresponding passages 40, are contemplated in the preferred embodiment, a round opening, a square opening and a triangular opening. The corresponding blocks, as illustrated in FIGS. 5, 6 and 7, will be, in cross section, circular, square and triangular, with each block being of a constant cross section throughout the effective height thereof. It is also contemplated that each block 36 be of a height slightly greater than the thickness of the sorting member or insert 12 for ease of manipulation of the block, particularly through the "funnel" passage with the enlarged mouth 42 upwardly directed.

The first surface 26, that is the surface through which the enlarged mouths or openings 42 open, has substantially the entire area thereof divided by the enlarged openings 42 into equal sections or segments, for example three triangular segments in the illustrated example of three passages. In this manner, a maximum width opening 42 is provided for each passage to facilitate to initial introduction the blocks 36, thus requiring minimal manipulative skill and/or manual dexterity. Further, the enlarged openings 42 allow for a ready viewing of the restricted configured opening 38 to allow for a visual comparison of the configured opening 38 with the individual blocks 36 as a guide to the child as to which block is to be introduced through the enlarged opening 42 for manipulation and guidance through the passage 40. If the child is unable to make the necessary visual comparison, the "funnel" configuration will still enable the introduction of the blocks for a "trial-and-error" manipulation of the blocks to determine whether the blocks will pass through the selected openings. The provision that the blocks be of a height slightly greater than the thickness of the sorting member 12, in conjunction with the relatively wide nature of the opening 42 at the corresponding end of the "funnel" facilitate block manipulation, even by the very young.

While the "funnel" passages 40 are generally of the same configuration, each will differ slightly in accord with the associated configured opening 38. For example, the passage leading to the circular opening will have a generally continuous curvilinear inner surface inward of the sector shaped opening 42. The passage leading to the rectangular opening will have four, generally planar surfaces leading to the configured opening. The passage leading to the triangular configured opening will have three generally planar surfaces.

Figure 2:
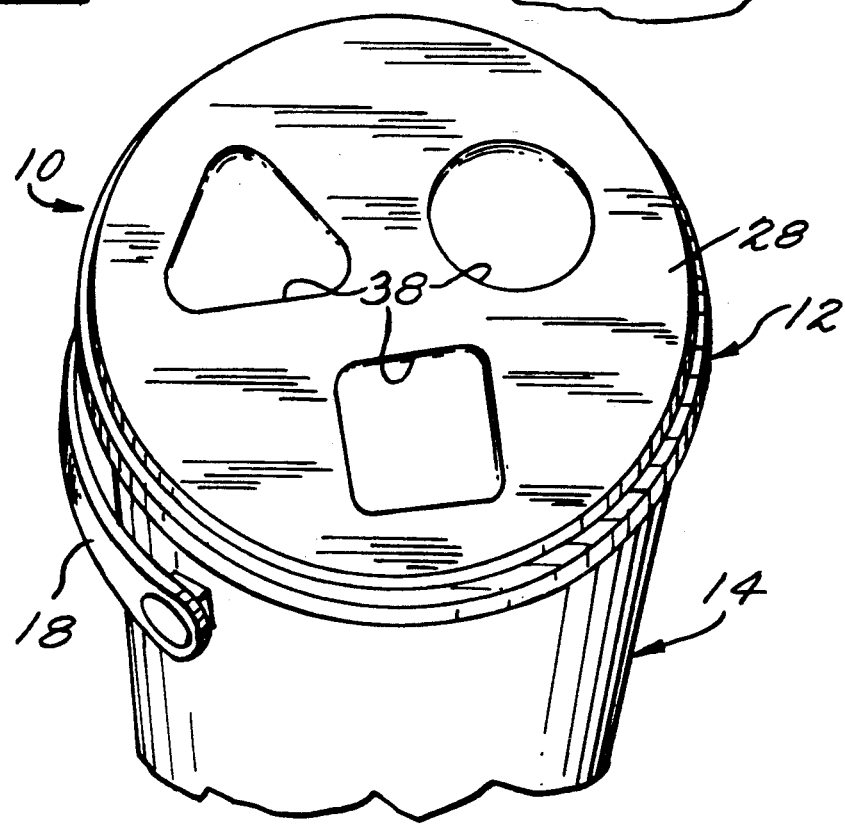
FIG. 2 is a partial perspective view similar to FIG. 1 with the sorting insert inverted and the reduced configured openings uppermost.

It is contemplated that with a user having minimal skills the sorting member or insert 12 will be positioned as illustrated in FIGS. 1 and 3 with the enlarged passage mouths 42 upwardly directed for a guided "funneling" of the blocks 36 into and through the corresponding passages 40. As the skill of the user increases less reliance can be placed on the guidance function of the tapered passages. Ultimately, the sorting member or insert 12 will be inverted with the second surface 28 and passage openings 38 upwardly directed as in FIG. 2. In this position, the educational toy will provide the maximum challenge to the user. It will thus be appreciated that the sorting device of the invention is particularly adapted for the accommodation, guidance, amusement and teaching of users with a wide range of manipulative skills and manual dexterity.

It is of course to be recognized that the invention is not limited to either the specific configurations or the number of passages illustrated.

The forming of the sorting member 12 as a hollow member allows for a sufficient thickness, approximately 1.5 inches (3.81 cm) to provide for a substantial "funnel" configuration between the enlarged opening 42 and the restricted configured opening 38, while also being of light weight and itself easily manipulated by a child for an inverting thereof as desired. The continuous peripheral walls of the passages 40 rigidify the sorting member 12, and in particular the spaced panels 22 and 24 thereof. As previously noted, it is contemplated the blocks 36 be slightly longer than the passages 40, approximately 1.625 inches (4.13 cm) to allow for a continuous manipulation of each block, introduced through the enlarged opening 42, until the block engages within the corresponding configured opening 38 for passage therethrough. The wide nature of the enlarged opening 42 also facilitates a continuous grasping of the block.

The provision of the sorting member as a frictionally engaged insert within the upper end of an open top pail enables use of the sorting member as a lid for the pail which in turn provides a convenient storage container for the individual blocks. The bail handle conveniently pivots between a first carrying position overlying the sorting member and a second stored position remote from the sorting member.

The foregoing is considered illustrative of the principals of the invention. Other embodiments as may occur to those skilled in the art, for example a rectangular container with a corresponding rectangular sorting member, are to be considered within the scope of the invention.

We claim:

1. A shape sorting device comprising an invertible sorting member and individual differently configured blocks, said sorting member having opposed spaced first and second surfaces, a plurality of passages transversely between said surfaces, said passages each having a first opening and a corresponding second opening respectively at and through said first and second surfaces, said second openings at said second surface being of different specific configurations corresponding to the differently configured blocks to accommodate only the correspondingly configured block therethrough, said first openings through said first surface each being substantially larger than said corresponding second openings through said second surface and of a size and shape to receive all of said blocks therethrough, each passage tapering from its first opening to its second opening whereby a corresponding block introduced through said first opening is guided to and through said second opening, support means for supporting said sorting member and for selectively positioning said first surface and said second surface outermost for selective introduction of said blocks either initially through said larger first openings for guided movement through said configured second openings from said first surface or initially through said second openings from said second surface.

2. The shape sorting device of claim 1 wherein said sorting member is hollow and includes spaced panels defining said first and second surfaces, and a peripheral side wall integral with and joining said panels, each of said passages having a continuous peripheral wall between said panels.

3. The shape sorting device of claim 2 wherein said support means comprises a container with an open mouth defined by a peripheral rim, said sorting member including a peripheral outwardly projecting rib about said peripheral side wall and centrally spaced between said panels to define opposed shoulders, said sorting member being selectively received within the container mouth with either of said surfaces positioned outermost relative to the container and with the corresponding shoulder of said projecting rib engaged on the rim of the container.

4. The shape sorting device of claim 3 wherein said first openings are of equal size and shape and divide said first surface into equal sections.

5. The shape sorting device of claim 4 wherein each said first opening is of a shape different from the shape of the corresponding second opening, the continuous peripheral wall of each passage, as said passage tapers from its larger first opening to its configured second opening, progressively conforming to the configuration of the configured second opening.

6. The shape sorting device of claim 5 wherein said blocks are of a length greater than the thickness of said sorting member between said first and second surfaces thereof.

7. The shape sorting device of claim 6 including a bail handle pivotally mounted to said container and moveable between a first carrying position overlying said sorting member supported on said container and a second stored position remote from said sorting member.

8. The shape sorting device of claim 1 wherein said first openings are of equal size and shape and divide said first surface into equal sections.

9. The shape sorting device of claim 1 wherein each said first opening is of a shape different from the shape of the corresponding second opening, each passage including a continuous peripheral wall tapering from its larger first opening to its configured second opening and progressively conforming to the configuration of the configured second opening.

10. An educational toy comprising a container with an opening therein, an invertible sorting member positionable on said container across said opening, said sorting member including opposed spaced generally parallel first and second surfaces, means for securing said sorting member to said container with each of said surfaces selectively uppermost by an inverting of said sorting member, said sorting member having a plurality of passages therethrough between said surfaces, a first opening from each passage through said first surface and a second opening from each passage through said second surface, each of said second openings having a specific configuration differing from the configurations of the remaining second openings, a separate block corresponding to each second opening and configured for close tolerance fitting through said corresponding second opening, said second openings and corresponding blocks being configured to allow passage of only a block of corresponding configuration through each second opening, said first openings of said passages each being substantially larger than said corresponding second opening and allowing passage of blocks configured for close tolerance fitting through each of said second openings, each passage tapering from its larger first opening to its configured second opening, each block being selectively introducible through its corresponding second opening from both said first surface and said second surface with introduction of said block through said first surface utilizing the corresponding tapered passage as guide means for movement of the block toward the corresponding second opening.

11. The educational toy of claim 10 wherein said first openings are of equal size and divide said first surface into equal segments.

12. The educational toy of claim 11 wherein the taper of each of said passages is continuous between said first and second openings.

13. The educational toy of claim 10 wherein said first openings are of substantially the same size and shape.

14. The educational toy of claim 13 wherein said first surface is generally circular with said first openings each being in the shape of a circle sector.

15. The educational toy of claim 14 wherein the circle sectors of said first openings are each equal to approximately one-third of the area of the generally circular first surface.

16. An educational toy comprising a receptacle with an opening therein, a sorting member positionable on said receptacle across said opening, said sorting member including opposed spaced generally parallel first and second surfaces, said sorting member having a plurality of passages therethrough between said surfaces, a first opening from each passage through said first surface and a second opening from each passage through said second surface, each of said second openings having a specific configuration differing from the configurations of the remaining second openings, a separate block corresponding to each second opening and configured for close tolerance fitting through said corresponding second opening, said second openings and corresponding blocks being configured to allow passage of only a block of corresponding configuration through each second opening, said first openings of said passages each being substantially larger than said corresponding second opening and allowing passage of blocks configured for close tolerance fitting through each of said second openings, each passage tapering from its larger first opening to its configured second opening, each second opening being visible through the associated first opening, each block being selectively introduced through its corresponding second opening from said first surface with introduction of said block through said first surface utilizing the corresponding tapered passage as guide means for movement of the block toward the corresponding second opening.

17. The educational toy of claim 16 wherein said first openings are of substantially the same size and shape.

18. The educational toy of claim 17 wherein said first surface is generally circular with said first openings each being in the shape of a circle sector.

* * * * *